US011232508B2

(12) United States Patent
Krappé

(10) Patent No.: US 11,232,508 B2
(45) Date of Patent: Jan. 25, 2022

(54) QUOTE-TO-CASH INTELLIGENT SOFTWARE AGENT

(71) Applicant: Apttus Corporation, San Mateo, CA (US)

(72) Inventor: Kirk G. Krappé, Menlo Park, CA (US)

(73) Assignee: Apttus Corporation, San Mateo, CA (US)

( * ) Notice: Subject to any disclaimer, the term of this patent is extended or adjusted under 35 U.S.C. 154(b) by 607 days.

(21) Appl. No.: 15/484,594

(22) Filed: Apr. 11, 2017

(65) Prior Publication Data

US 2018/0293640 A1 Oct. 11, 2018

(51) Int. Cl.
*G06Q 30/06* (2012.01)
*H04L 12/58* (2006.01)
(Continued)

(52) U.S. Cl.
CPC ..... *G06Q 30/0633* (2013.01); *G06Q 30/0207* (2013.01); *G06Q 30/0611* (2013.01); *H04L 51/02* (2013.01); *H04L 67/306* (2013.01)

(58) Field of Classification Search
CPC ........... G06Q 30/0633; G06Q 30/0207; G06Q 30/0611; H04L 51/02; H04L 67/306
(Continued)

(56) References Cited

U.S. PATENT DOCUMENTS 5,960,407 A 9/1999 Vivona
6,473,084 B1 10/2002 Phillips et al.
(Continued)

FOREIGN PATENT DOCUMENTS

CN 1315705 3/2001
EP 2650776 A1 * 10/2013 ......... G10L 15/1822
(Continued)

OTHER PUBLICATIONS

Qitao Xie, et al. "Chatbot Application on Cryptocurrency," 2019, 2019 IEEE Conference on Computational Intelligence for Financial Engineering & Economics (CIFEr) (pp. 1-8) (Year: 2019).*
(Continued)

*Primary Examiner* — Hani M Kazimi
*Assistant Examiner* — Alison L. Lamb
(74) *Attorney, Agent, or Firm* — Lessani Law Group, PC

(57) ABSTRACT

The present disclosure relates to an intelligent quote-to-cash software agent ("the Agent") that enables users to efficiently interface with a quote-to-cash system from external messaging applications. The Agent is able to communicate with users using natural language and to identify quote-to-cash system action requests and associated parameters from natural language communications. The user may communicate with the Agent from one of plurality of messaging applications that are not associated with the quote-to-cash system. In response to identifying a quote-to-cash action request and associated parameters in a communication session with a user, the Agent calls the quote-to-cash system and obtains the applicable quote-to-cash output requested by the user. The Agent forwards the quote-to-cash system output to the user via the external messaging application selected by the user. The Agent may initiate communications with the user to inform the user of an opportunity in the quote-to-cash process.

15 Claims, 17 Drawing Sheets

(51) Int. Cl.
*G06Q 30/02* (2012.01)
*H04L 29/08* (2006.01)

(58) Field of Classification Search
USPC .......................................................... 705/35
See application file for complete search history.

(56) References Cited

U.S. PATENT DOCUMENTS

| | | |
|---|---|---|
| 7,328,177 B1 | 2/2008 | Lin-Hendel |
| 7,574,381 B1 | 8/2009 | Lin-Hendel |
| 7,725,358 B1 | 5/2010 | Brown et al. |
| 8,498,954 B2 | 7/2013 | Malov et al. |
| 8,644,842 B2 | 2/2014 | Arrasvuori et al. |
| 9,519,907 B2 | 12/2016 | Carter, III et al. |
| 10,289,261 B2 | 5/2019 | Aggarwal et al. |
| 10,621,640 B2 | 4/2020 | Krappe et al. |
| 10,783,575 B1 | 9/2020 | Krappé |
| 2002/0040332 A1 | 4/2002 | Maari et al. |
| 2003/0033240 A1 | 2/2003 | Balson et al. |
| 2006/0100912 A1 | 5/2006 | Kumar et al. |
| 2007/0016536 A1 | 1/2007 | Mirlas et al. |
| 2007/0039209 A1 | 2/2007 | White et al. |
| 2007/0087756 A1 | 4/2007 | Hoffberg |
| 2007/0162373 A1 | 7/2007 | Kongtcheu |
| 2008/0046355 A1 | 2/2008 | Lo |
| 2008/0091551 A1 | 4/2008 | Olheiser et al. |
| 2009/0048937 A1 | 2/2009 | Contreras et al. |
| 2009/0222319 A1 | 9/2009 | Cao et al. |
| 2009/0234710 A1 | 9/2009 | Belgaied Hassine et al. |
| 2009/0327166 A1 | 12/2009 | Carter, III et al. |
| 2010/0179859 A1 | 7/2010 | Davis et al. |
| 2010/0262478 A1 | 10/2010 | Bamborough et al. |
| 2010/0306120 A1 | 12/2010 | Ciptawilangga |
| 2012/0173384 A1 | 7/2012 | Herrmann et al. |
| 2012/0221410 A1 | 8/2012 | Bennett et al. |
| 2012/0246035 A1 | 9/2012 | Cross et al. |
| 2012/0254092 A1 | 10/2012 | Malov et al. |
| 2013/0103391 A1* | 4/2013 | Millmore ................ G06F 17/27 704/9 |
| 2013/0132273 A1 | 5/2013 | Stiege et al. |
| 2014/0025529 A1 | 1/2014 | Honeycutt et al. |
| 2014/0149273 A1 | 5/2014 | Angell et al. |
| 2015/0120526 A1 | 4/2015 | Peterffy et al. |
| 2015/0142704 A1 | 5/2015 | London |
| 2015/0309705 A1 | 10/2015 | Keeler et al. |
| 2015/0348551 A1* | 12/2015 | Gruber ................ H04M 3/4936 704/235 |
| 2015/0378156 A1 | 12/2015 | Kuehne |
| 2016/0034923 A1 | 2/2016 | Majumdar et al. |
| 2017/0004588 A1* | 1/2017 | Isaacson ............. G06Q 20/065 |
| 2017/0068670 A1* | 3/2017 | Orr ........................ G06F 16/48 |
| 2017/0124176 A1 | 5/2017 | Beznos et al. |
| 2017/0124655 A1 | 5/2017 | Crabtree et al. |
| 2017/0243107 A1* | 8/2017 | Jolley ...................... G06N 5/02 |
| 2017/0351241 A1 | 12/2017 | Bowers et al. |
| 2017/0358024 A1 | 12/2017 | Mattingly et al. |
| 2018/0005208 A1 | 1/2018 | Aggarwal et al. |
| 2018/0096406 A1 | 4/2018 | Krappe et al. |
| 2018/0285595 A1* | 10/2018 | Jessen .................... H04L 67/14 |

FOREIGN PATENT DOCUMENTS

| | | |
|---|---|---|
| EP | 3073421 | 9/2016 |
| JP | 2001290977 | 10/2001 |
| JP | 2017146909 | 8/2017 |
| WO | 0052605 | 9/2000 |
| WO | 03003146 | 1/2003 |
| WO | 2015106353 | 7/2015 |

OTHER PUBLICATIONS

Oracle: Automating the Quote-to-Cash Process: An Oracle White Paper, Jun. 2009, pp. 1-19, 2009.
Microsoft/APTTUS: Ultimate Guide to Quote-To-Cash for Microsoft Customers, Web Archives, Oct. 1, 2015, pp. 1-28.
Wainwright, Phil, "Salesforce, Microsoft quote-to-cash partner Apttus raises $88m", Sep. 29, 2016, pp. 1-7.
PCT International Search Report and Written Opinion in PCT/US2017/062185, 13 pages, dated Mar. 2, 2018.
Riggins, J., "Interview Quote-to-Cash Pioneers Apttus Links Leads to Revenue", May 21, 2014, pp. 1-7.
Wainewright, Phil, Apttus Applies Azure Machine Learning to Quote-to-Cash, Apr. 3, 2016, pp. 1-5.
McCormick, M., "What is Quote to Cash?" Jan. 20, 2016, Blog, BlackCurve, pp. 1-8, 2016.
Morelli et al., "IBM SPSS Predictive Analytics: Optimizing Decisions at the point of impact", pp. 1-59, 2010.
Wireless News: Banglalink Keeps Mobile Subscribers Using Predictive Analytics with KXEN, Close-Up Media, Inc., pp. 1-2, Oct. 5, 2013.

* cited by examiner

QUOTE-TO-CASH INTELLIGENT SOFTWARE AGENT

BACKGROUND OF THE INVENTION

1. Field of the Invention

This invention relates generally to product configuration and pricing systems and, more specifically, to an intelligent software agent that enables users to efficiently interface with a quote-to-cash system from external messaging applications.

2. Description of the Background Art

Quote-to-cash systems integrate and automate end-to-end sell-side processes, from creating a quote for a prospective customer to collecting revenue and managing renewals. For example, quote-to-cash systems facilitate sales transactions by enabling users to configure products, price products, generate quotes, provide product recommendations, create and sign contracts, manage billings, and perform other sell-side business functions. Many quote-to-cash systems are offered as software-as-a-service (SasS) applications, and some run on or in connection with customer relationship management (CRM) systems.

Traditionally, users access a quote-to-cash system via a user interface specific to the quote-to-cash system or an associated CRM system. For example, a user may log into a web interface or access the quote-to-cash system via a dedicated application on a mobile device. This requires the user to learn how to use a series of interfaces, and the quote-to-cash provider must invest significantly in training and incentivizing adoption. Furthermore, when performing multiple tasks on a device, a user must switch between the quote-to-cash application and other applications on the device. For example, when performing both messaging and quote-to-cash functions on a device a user must switch between the messaging application and the quote-to-cash application. Moreover, logging in via the web is often not convenient when users are away from their work desk. Therefore, there is market demand for a solution that enables a user to more efficiently and conveniently interact with a quote-to-cash system.

SUMMARY OF THE DISCLOSURE

The present disclosure relates to an intelligent quote-to-cash agent ("the Agent") that enables users to efficiently interface with a quote-to-cash system from external messaging applications that are primarily designed for person-to-person communications (e.g., SKYPE for business, MICROSOFT TEAMS, SLACK, FACEBOOK WORKPLACE, etc.). Users are able to send the Agent quote-to-cash commands and obtain quote-to-cash system output from such messaging applications. Thus, users need not login to the quote-to-cash system or navigate screens within the quote-to-cash system interface to perform quote-to-cash functions. The Agent and users are able to communicate with each other using natural language.

In response to receiving a natural language message from a user in an external messaging application, the Agent identifies any quote-to-cash action requests and associated parameters in the message. If additional parameters are required to execute the quote-to-cash action, the Agent prompts the user for the parameters by communicating with the user using natural language and the external messaging application. Once the Agent has received the required parameters for a quote-to-cash action request, the Agent calls the quote-to-cash system with the action request and associated parameters. The Agent receives the corresponding output from the quote-to-cash system (e.g., a quote, a contract, discount information, product upsell information, etc.) and provides the output to the user via the applicable messaging application.

In certain embodiments, the Agent also may initiate communications with the user in an external messaging application when the Agent, in conjunction with a quote-to-cash system, identifies an opportunity for an improved outcome in the quote-to-cash process. For example, the Agent may proactively reach out to the user when a renewal opportunity, a pending approval, or an updated contract status relevant to the user is identified.

In certain embodiments, the user may communicate with the Agent from within an augmented or virtual reality interface to the quote-to-cash system.

BRIEF DESCRIPTION OF THE DRAWINGS

FIGS. 5A-5L are text messaging screen shots that illustrate an example dialog between the Agent and a user via a text messaging interface.

DETAILED DESCRIPTION OF THE PREFERRED EMBODIMENTS

The present disclosure relates to an intelligent quote-to-cash agent ("the Agent") that enables users to efficiently interface with a quote-to-cash system from external messaging applications. The Agent enable users to enter quote-to-cash commands and obtain output from the quote-to-cash system without logging into the system and without having to navigate through screens in the quote-to-cash system's user interface. In one embodiment, a quote-to-cash system is any system that performs at least one or more of the following business functions: (1) configure, price, and quote; (2) contract generation and management; (3) revenue management (e.g., billing and financial reporting); and (4) product recommendations (e.g., identifying upsell and cross sell opportunities) and other machine learning recommendations to optimize the sales process.

As described in more detail below, the Agent is able to communicate with users using natural language and to identify quote-to-cash system action requests (i.e., commands for the quote-to-cash system) and associated parameters from natural language communications. The user may communicate with the Agent from one of a plurality of messaging applications that are not associated with the quote-to-cash system. In response to identifying a quote-to-cash action request and associated parameters in a communication session with a user, the Agent calls the quote-to-cash system and obtains the applicable quote-to-cash output requested by the user. The Agent forwards the quote-to-cash system output to the user via the external messaging application selected by the user.

The Agent is a computer system executing software that enables the system to perform the Agent functions described herein. In the preferred embodiment, the Agent software is hosted and deployed on a cloud network environment, and the Agent system can interface with multiple inputs (e.g., messaging applications) and multiple outputs (e.g., multiple quote-to-cash systems running on multiple platforms) simultaneously.

Figure 1A:
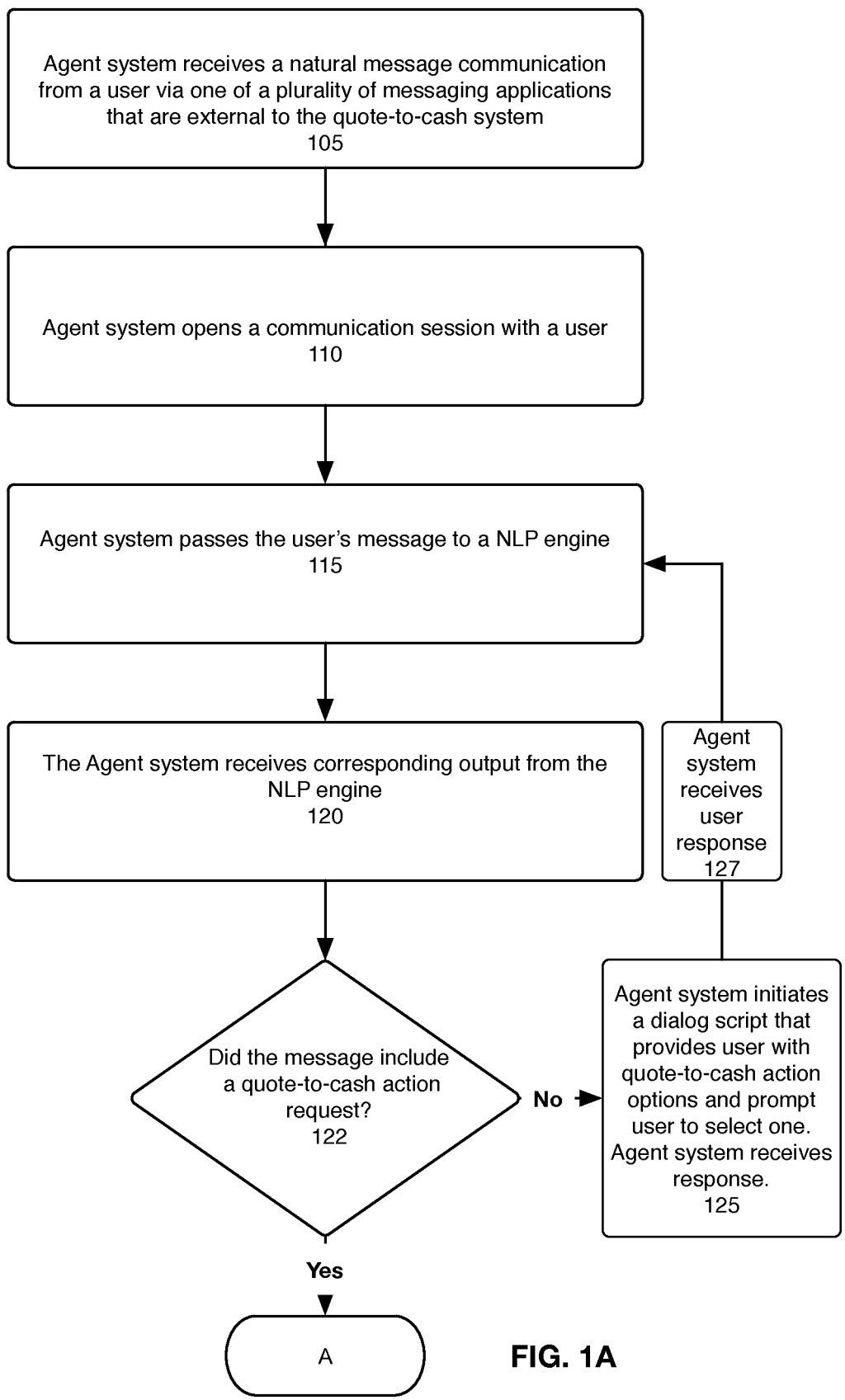
FIGS. 1A-C are flowcharts that illustrate a method, according to one embodiment, for enabling a user to initiate communications with the Agent and obtain a quote-to-cash output from the Agent.
Figure 1B:
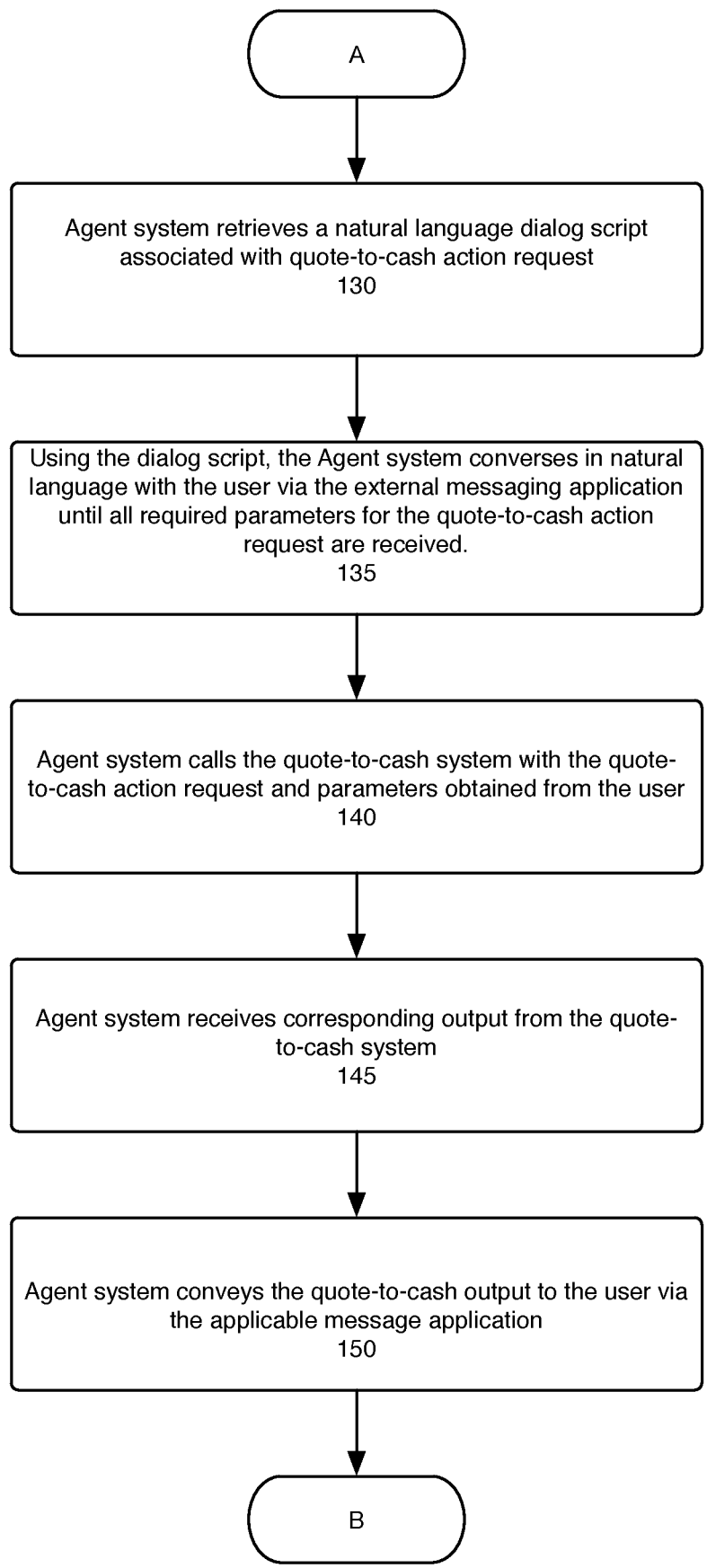
Figure 1C:
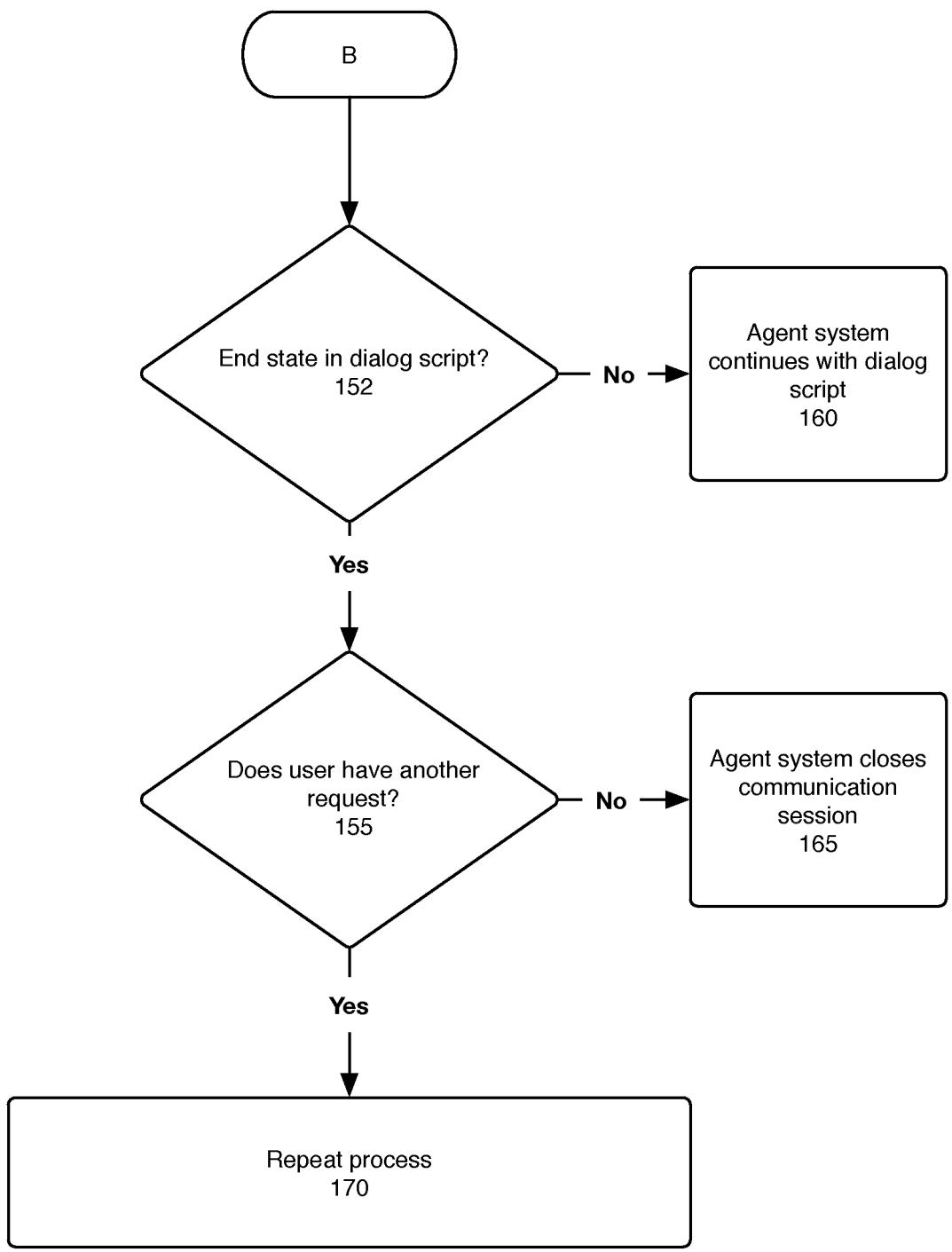

FIGS. 1A-C illustrate a method, performed by the Agent, for enabling a user to initiate communications with the Agent and obtain a quote-to-cash system output from the Agent. The Agent receives a natural language message communication from a user via one of a plurality of messaging applications that are external to the quote-to-cash system (step 105). The Agent opens a communication session with the user (step 110) and passes the message to a natural language processing engine (NLP) (step 115). The Agent receives the corresponding output from the NPL engine (step 120) and determines whether the user message included a quote-to-cash action request (i.e., a command) and any associated parameters (step 122). If the user message did not include a quote-to-cash action request, the Agent initiates a dialog that provides the user with quote-to-cash action options and prompts the user to select one (see steps 125 and 127). Examples of quote-to-cash action options are create quote, generate agreement, clone quote, apply discount, generated proposal, add product to cart, add bundled product to cart, add option to bundle, remove option, provide upsell recommendation, obtain approval for contract or discount, and update price.

If the user message included a quote-to-cash action request, the Agent retrieves a natural language dialog script associated with the quote-to-cash action request (step 130). In one embodiment, there is a dialog script associated with each quote-to-cash action. Each quote-to-cash action is associated with parameters, and the purpose of the dialog script to obtain parameters from the user. In other words, the dialog script defines the parameters that the Agent needs to obtain for the quote-to-cash action. If user requests a quote, the Agent may request parameters such as the customer for whom the quote is requested, the price list to use, the products and associated quantity, and any discounts. For an upsell recommendation or a discount, the Agent may request the products currently in the cart. For a contract or discount approval request, the Agent may request the applicable Contract or products in the cart (for discount). If the initial user message includes recognizable parameters for the quote-to-cash action request, the return from the NLP engine will include the parameters. The user can obtain a quote-to-cash output quicker (and shorten the interaction with the Agent) by including parameters in the initial request.

Using the dialog script, the Agent converses (in natural language) with the user via the applicable messaging application until all the required parameters for the action request are received (step 135). The Agent bypasses any portion of the script related to parameter(s) conveyed in the initial message (if any). Each subsequent user utterance in the conversation is passed to the NLP engine to determine whether the utterance contains a parameter or a change of action request (e.g., terminating the request) and the Agent traverses the dialog script accordingly, bypassing any portions of the script related to parameters already received.

Once all the required parameter values are received, the Agent calls the quote-to-cash system with the action request and parameters obtained from the user (step 140). The Agent receives the corresponding output from the quote-to-cash system (step 145). For example, if the action request, is to create a quote, the quote-to-cash system returns a quote to the Agent. In certain cases, the quote-to-cash system output may be confirmation that an action has been performed. For example, if the request was to email an NDA to a customer contact, the output may be a confirmation that the requested NDA was emailed.

The Agent conveys the quote-to-cash output to the user via the applicable messaging application (i.e., the messaging application via which the user and the Agent have been communicating) (step 150). If the Agent has received an end state in the dialog scrip, the Agent asks the user if he has an additional request (steps 152, 155). If so, the above process repeats, except for step 110 as the communication session with the user is already open (step 170). If not, the Agent closes the communication session with the user (step 165). If the Agent has not received an end state in the dialog script, the Agent continues with the dialog script (step 152, 160).

In the preferred embodiment, the Agent is able to interface with multiple messaging applications, including applications that users ordinarily use in regular business applications. This enables users to efficiently access the quote-to-cash system. For example, if an enterprise uses a certain messaging application for internal communications (e.g., SLACK), being able to initiate quote-to-cash actions and obtain quote-to-cash system output via that messaging application saves users within the enterprise time and effort in completing their task. Users within such enterprise are likely using the messaging application throughout the day, and being able to interface with the quote-to-cash system via the messaging application saves the users from having to switch applications or log into the quote-to-cash system. The Agent is able to communicate with voice-based messaging applications, text-based messaging application, and, in some embodiments, virtual reality or augmented reality messaging applications. For each messaging application with which the Agent communicates, the Agent has a unique user ID that allows the Agent to send and receive messages (e.g. an email address or contact information). In other words, the Agent is treated the same as human users by the messaging applications.

In one embodiment, in responding to user quote-to-cash action requests, the Agent accesses machine learning insights of the quote-to-cash system to provide a better quote-to-cash outcome. For example, the quote-to-cash system may apply machine learning to customer and sales history to garner action recommendations (e.g., product recommendations, discount recommendations, etc.). The Agent accesses or receives these action recommendations when applicable to the user and passes them on to the user via the applicable messaging channel. For example, when the user requests a quote, the Agent may suggest a product discount. In this way, the Agent can prompt users in ways that can facilitate the sales process. In one embodiment, in response to the Agent calling the quote-to-cash system with an action request, the quote-to-cash system determines whether any machine learning insights are applicable to the request and, if so, passes the information on to the Agent along with the requested output. Also, within a dialog script, the Agent may be prompted to call the quote-to-cash system to obtain product recommendations, discount recommendations, or other recommendations. If quote-to-cash system returns a recommendation to the Agent, the dialog script instructs the Agent to convey the recommendation to the user.

Machine learning may also be applied to the user's interactions with the system to identify the user's patterns. In certain embodiments, the Agent uses pattern recognition analysis to anticipate the user's actions and to make the process of obtaining a quote-to-cash output more efficient. Type of machine learning/pattern recognition techniques that may be used include probabilistic classifiers, frequency set, and cohort analysis. The dialog script may include variables whose values are a pattern recognition result. If the dialog script includes such a variable, the Agent calls the quote-to-cash system for the value of the variable and uses the value in its dialog with the user. For example, in FIG. 5C below, the script includes a variable for the term of the license, and the Agent fills it in with "a year" based on pattern recognition results from the quote-to-cash system.

Figure 5A:
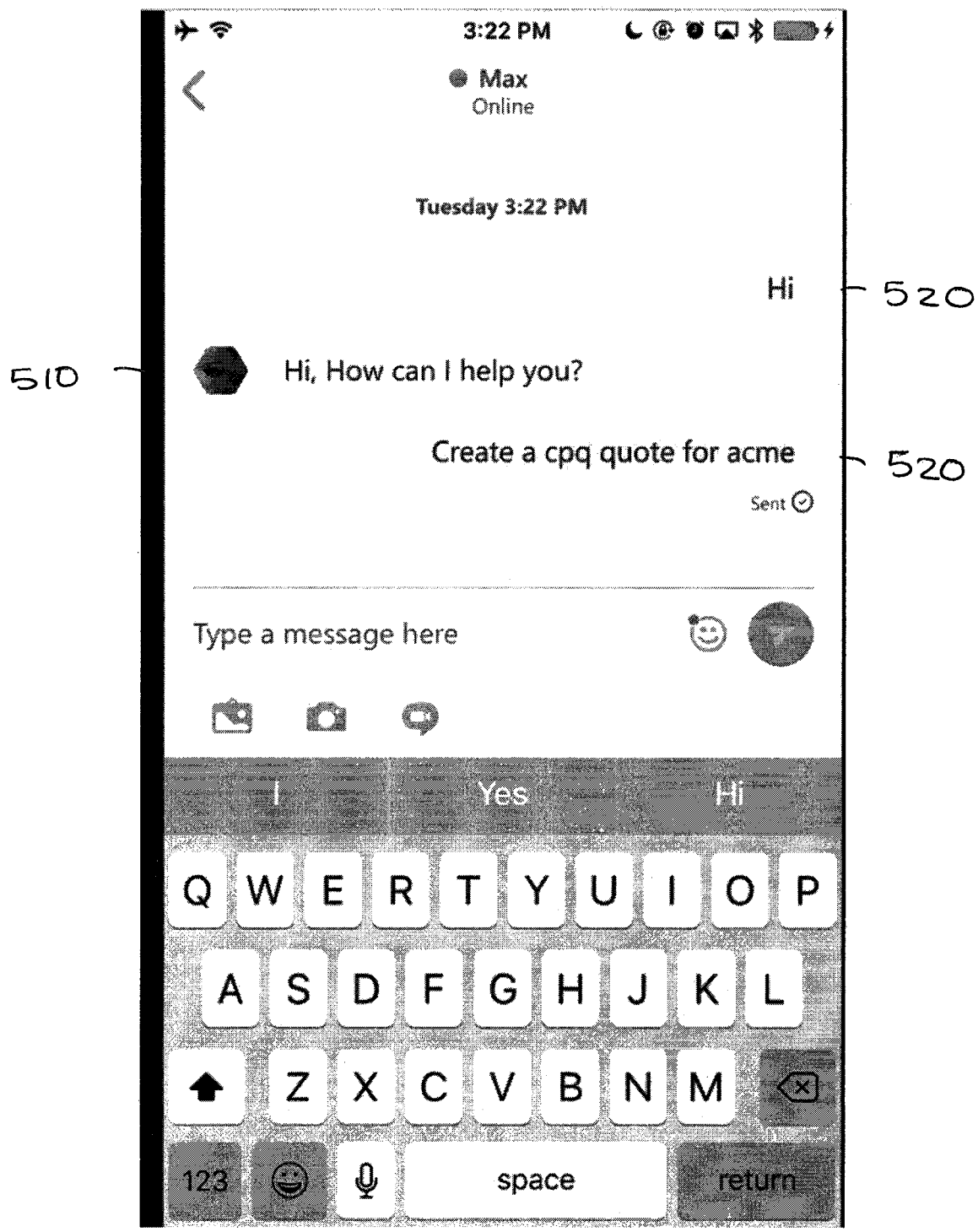

FIGS. 5A-5L illustrate an example dialog between the Agent and a user via a text messaging interface. In this example, the user is a salesperson for a company that offers CPQ (configure-price-quote) software products for licensing, and parameters for creating a CPQ quote are the customer name, the type of CPQ product, the number and type of users, and the term of the software license. Agent communications are labeled with the reference number 510, and user (i.e., salesperson) communications are labeled with the reference number 520. Below is a summary of the dialog:

FIG. 5A: The user tells the Agent that he would like to create a quote for a CPQ product for the "Acme" corporation.

Figure 5B:
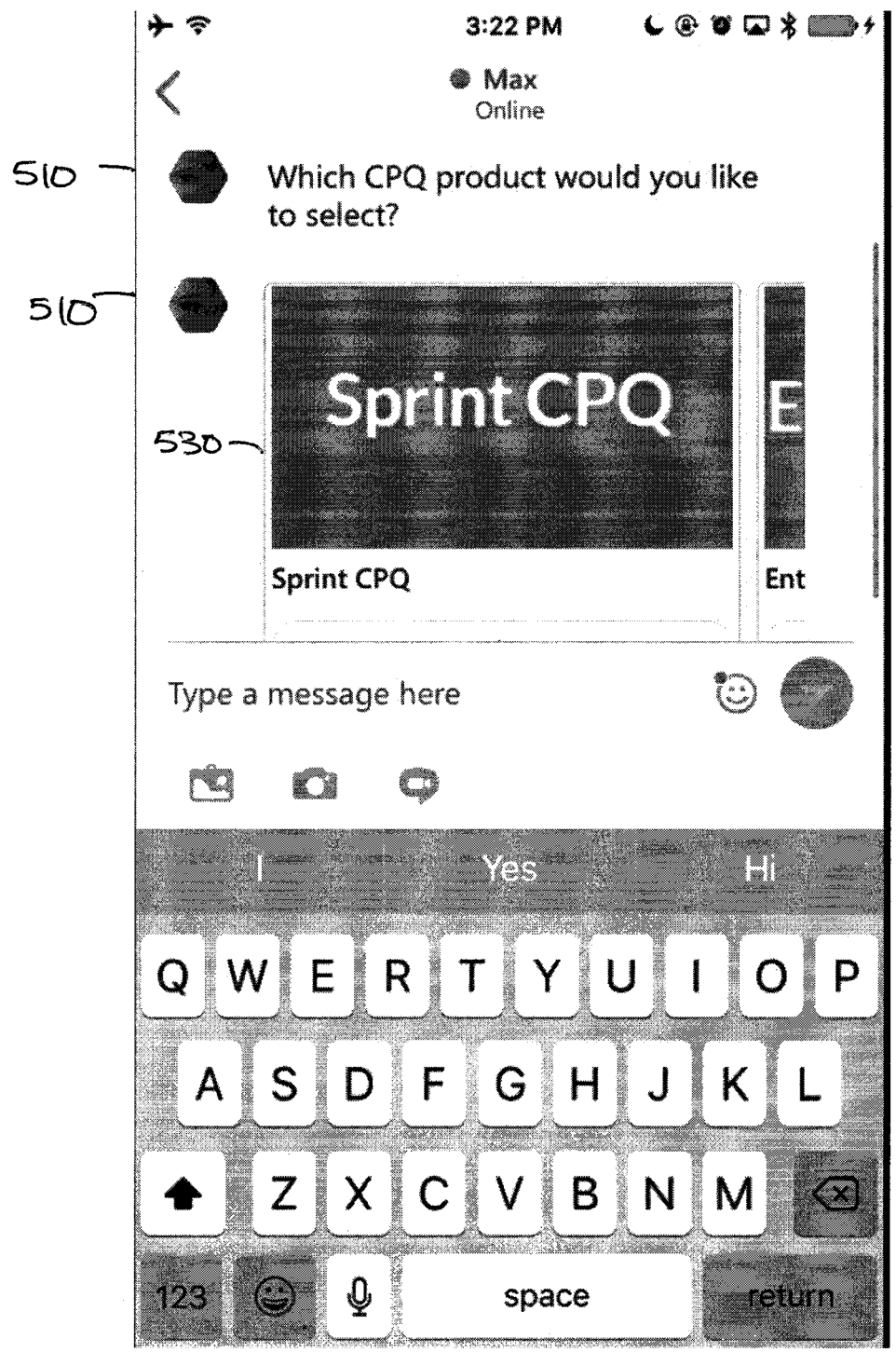

FIG. 5B: The Agent asks the user to select a CPQ product for the quote, and provides the user with a product catalog 530. The user can swipe sideways to see the contents of the catalog.

Figure 5C:
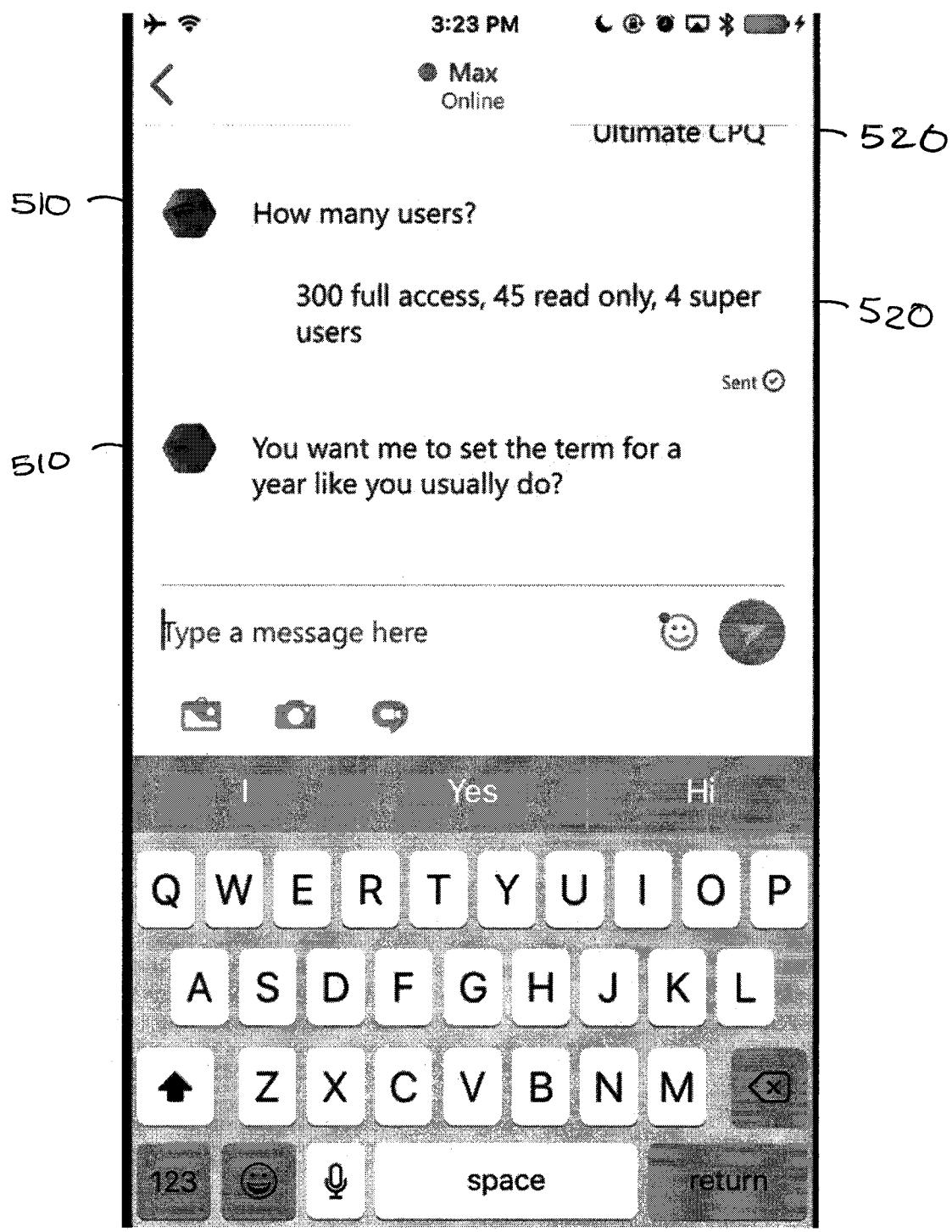

FIG. 5C: The user selects a product ("Ultimate CPQ"), and the Agent asks how many users the license will include. The user replies to the Agent with the number and type of users. If the user had not specified the type, the Agent would have prompted the user for this information, but the Agent skipped that part of the dialog because the user included that information in his reply. The Agent also asks the user about the term for the quote (i.e. "You want me to set the term for a year like you usually do?"). In this case, the Agent accesses pattern recognition analysis of user behavior from the quote-to-cash system to identify the term the user usually selects. In this sense, the Agent is not going through a rote dialog script, but instead employing user patterns to facilitate the process and provide context for the interaction. The Agent now has all the parameters for a quote and calls the quote-to-cash system for the quote.

Figure 5D:
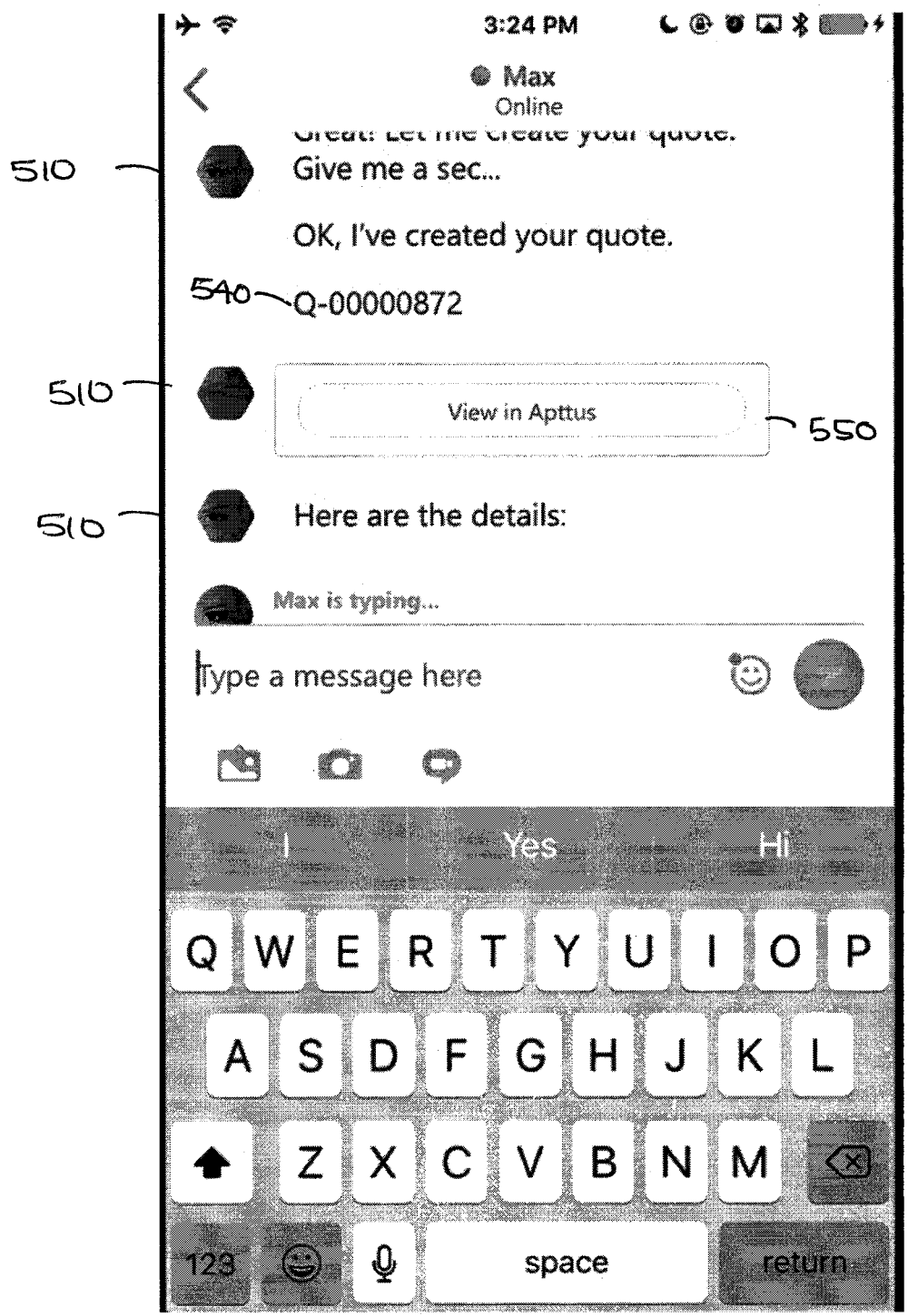

FIG. 5D: The Agent provides the quote 540 to the user within the text messing interface. The Agent also provides a button/link 550 that the user can select to view the quote in the quote-to-cash system interface.

Figure 5E:
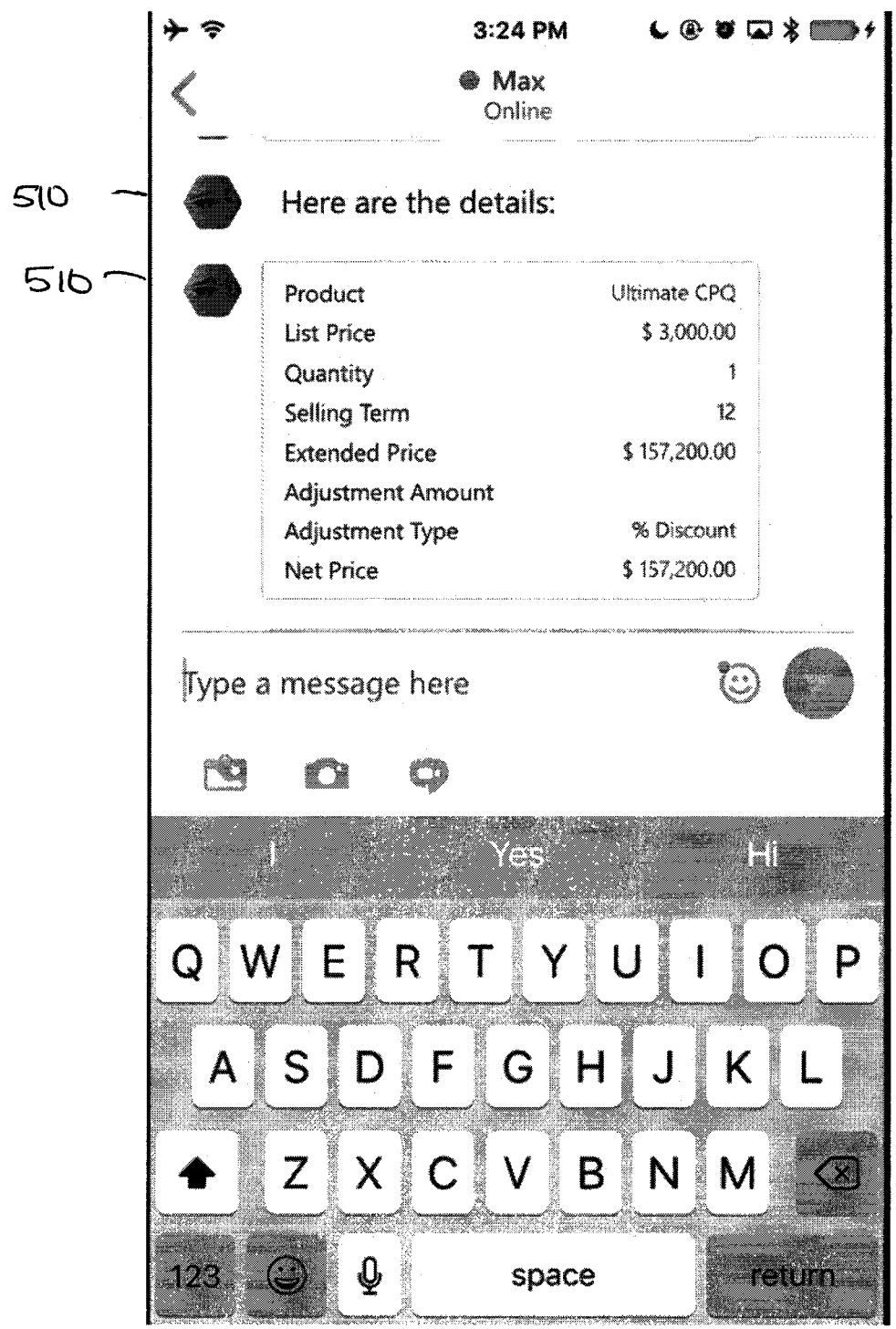

FIG. 5E: The Agent displays a summary of the quote.

Figure 5F:
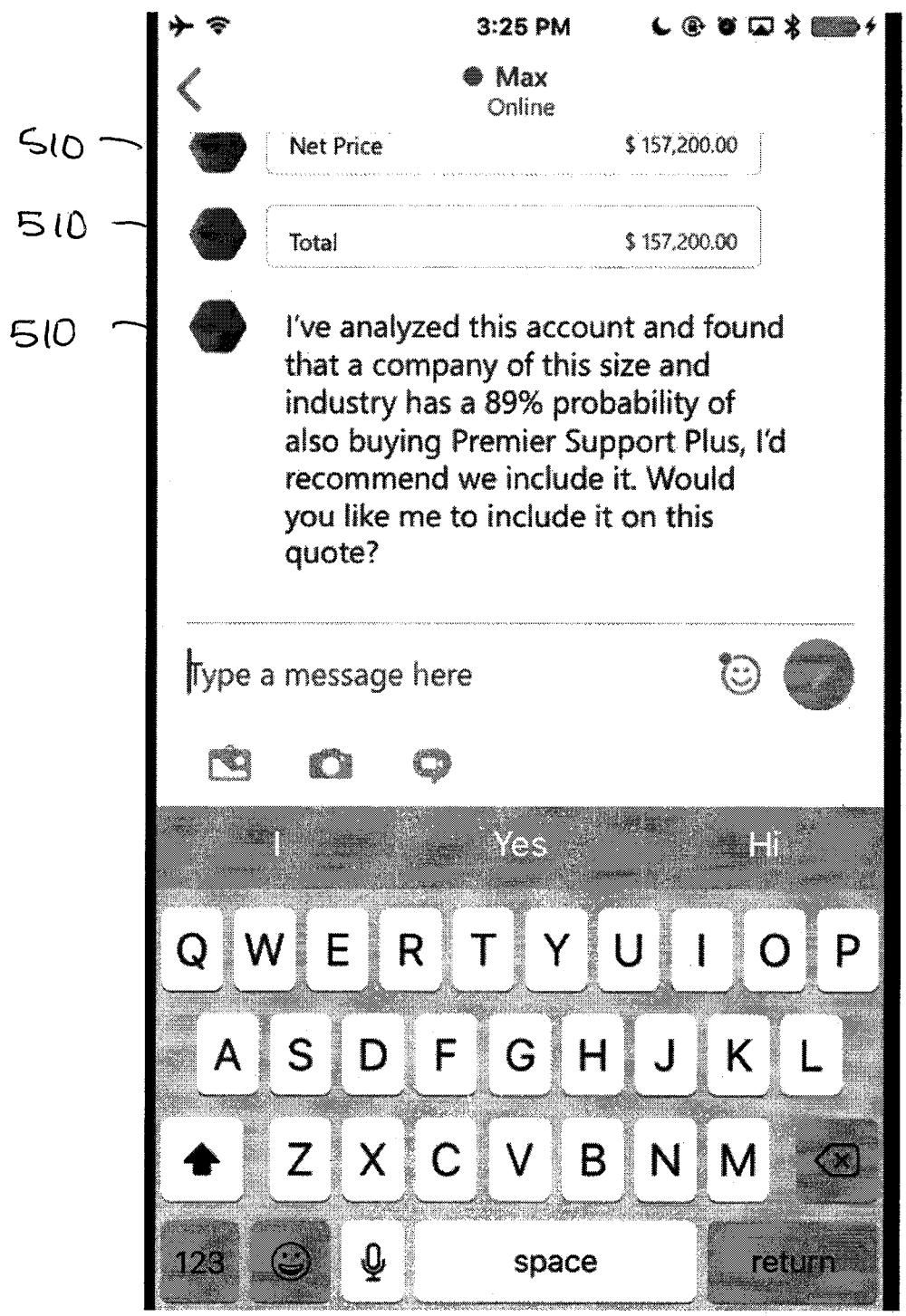

FIG. 5F: The Agent recommends that the user also include another product, "Premier Support Plus," in the quote. This is an example of the Agent accessing machine learning and using the results of the machine learning to make and initiate customized recommendations.

Figure 5G:
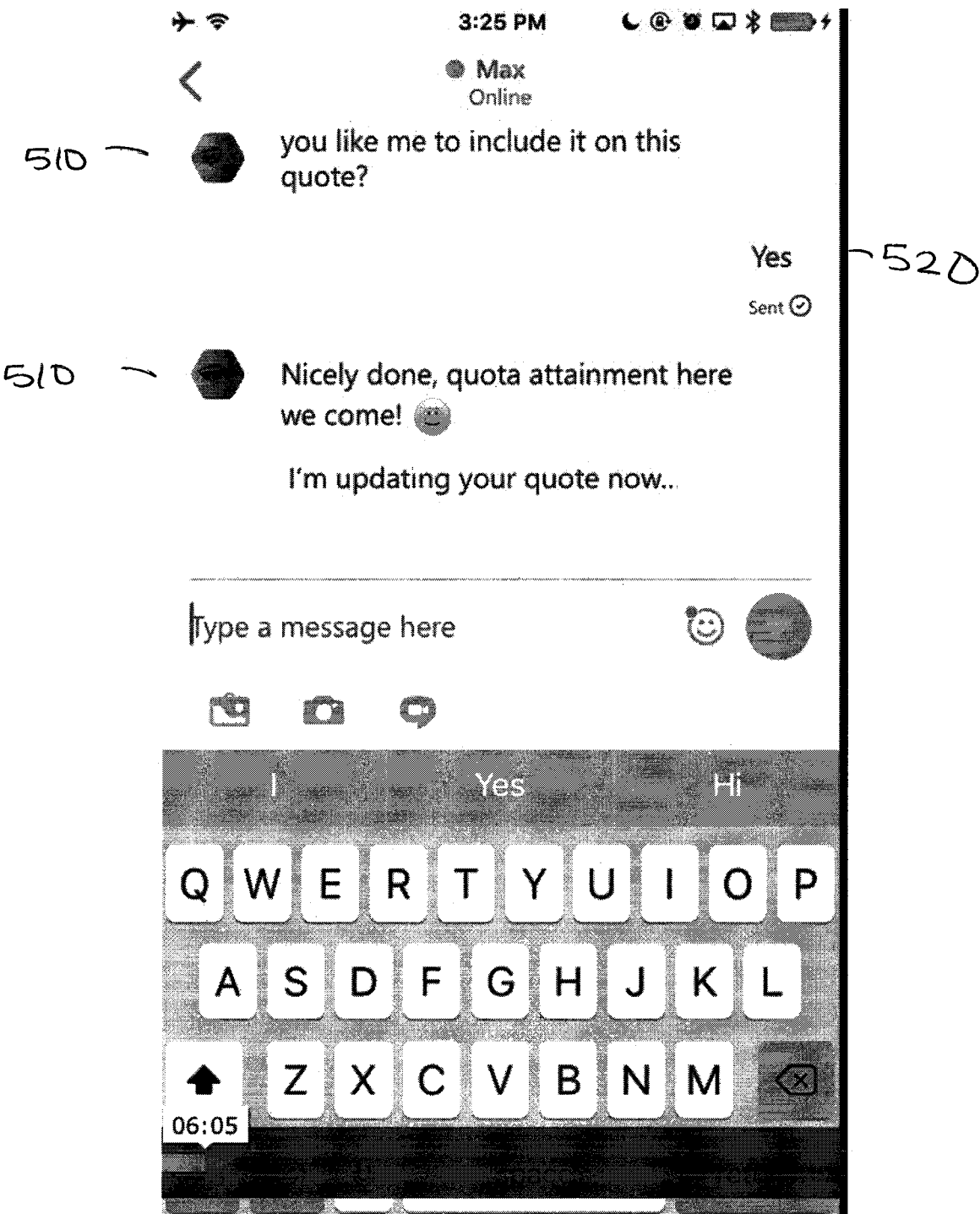
Figure 5H:
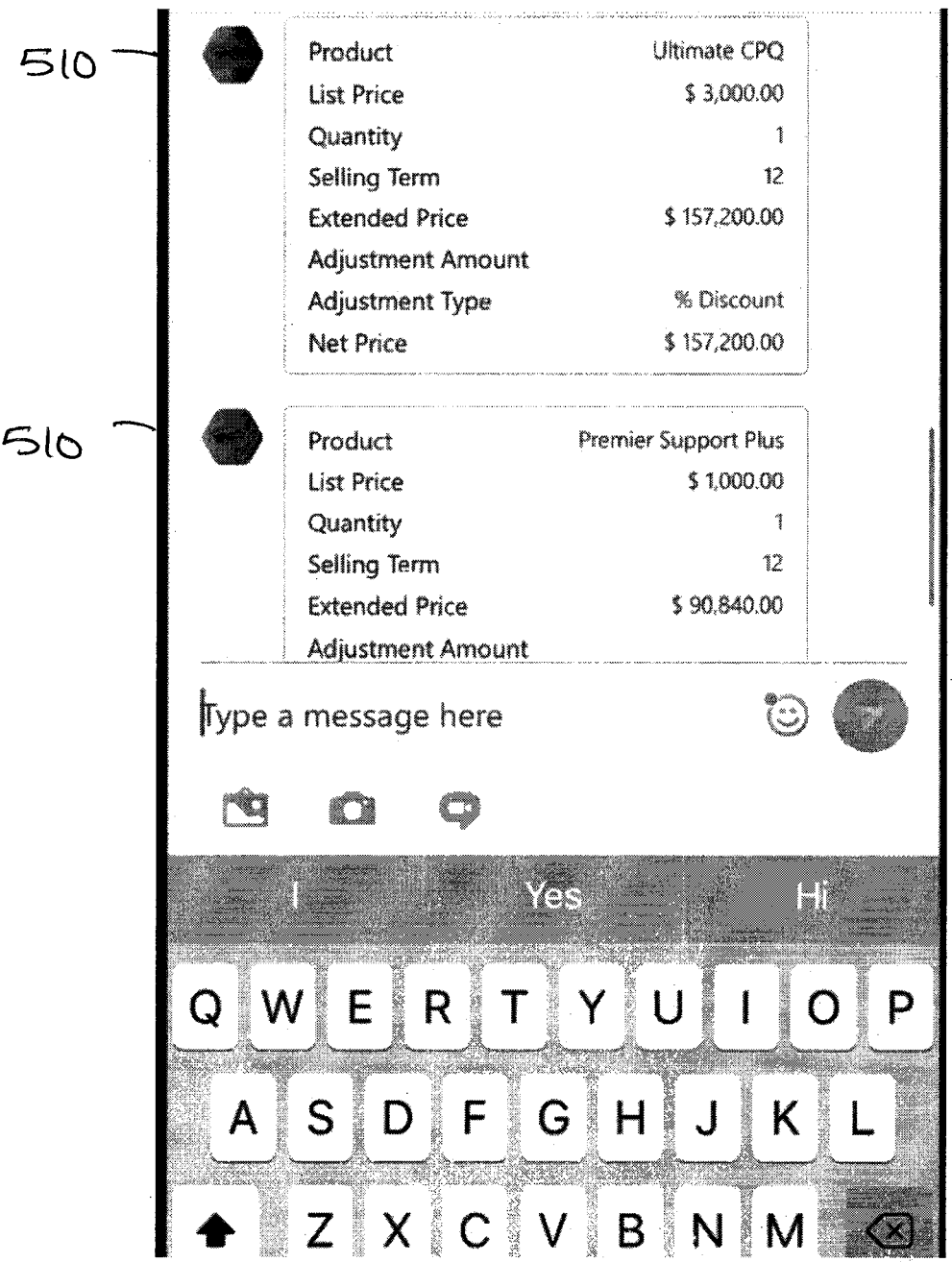

FIGS. 5G and 5H: The user agrees to add the recommended product to the quote, and the Agent updates the quote accordingly.

Figure 5I:
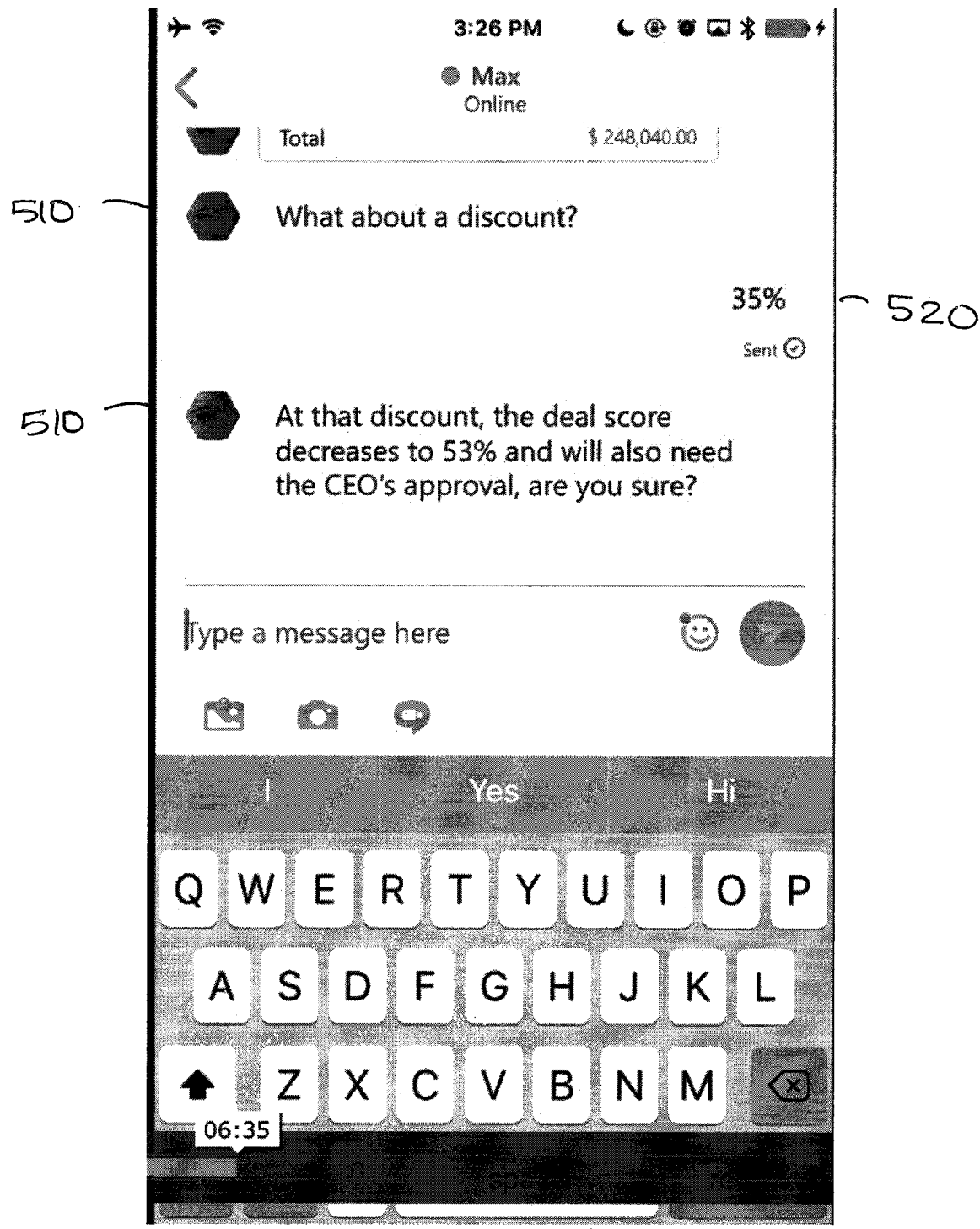

FIG. 5I: The Agent asks the user if he would like to apply a discount to the quote, and the user replies with 35%. The Agent then informs the user that a 35% discount will cause the deal score to decrease to 53% and will require CEO approval.

Figure 5J:
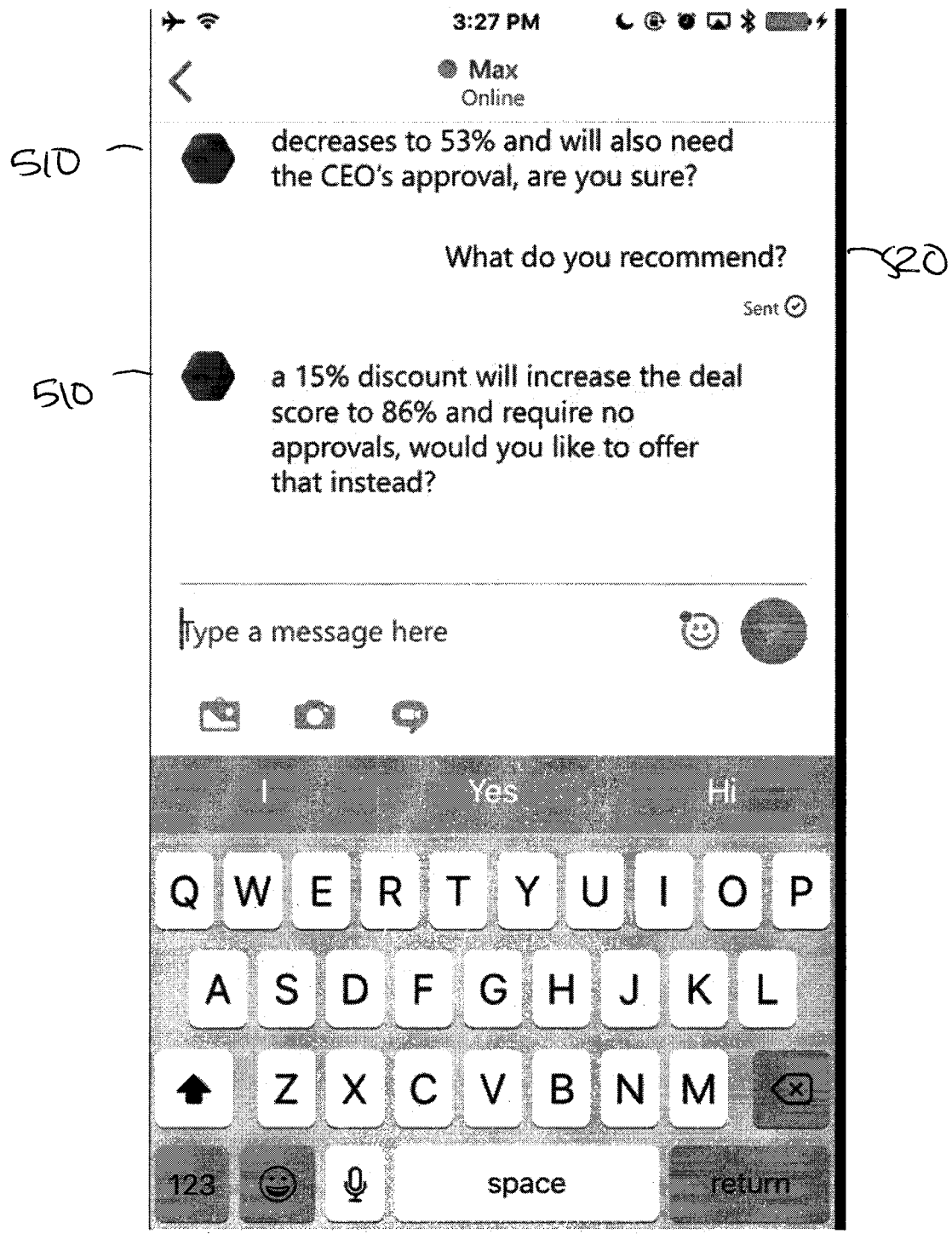

FIG. 5J: The user asks the Agent what it recommends, and the Agent provides the recommendation. This is another example of the Agent access machine learning results generated by the quote-to-cash system to make the process more efficient and effective for the user and his company. The user agrees to the 15% discount (not shown).

Figure 5L:
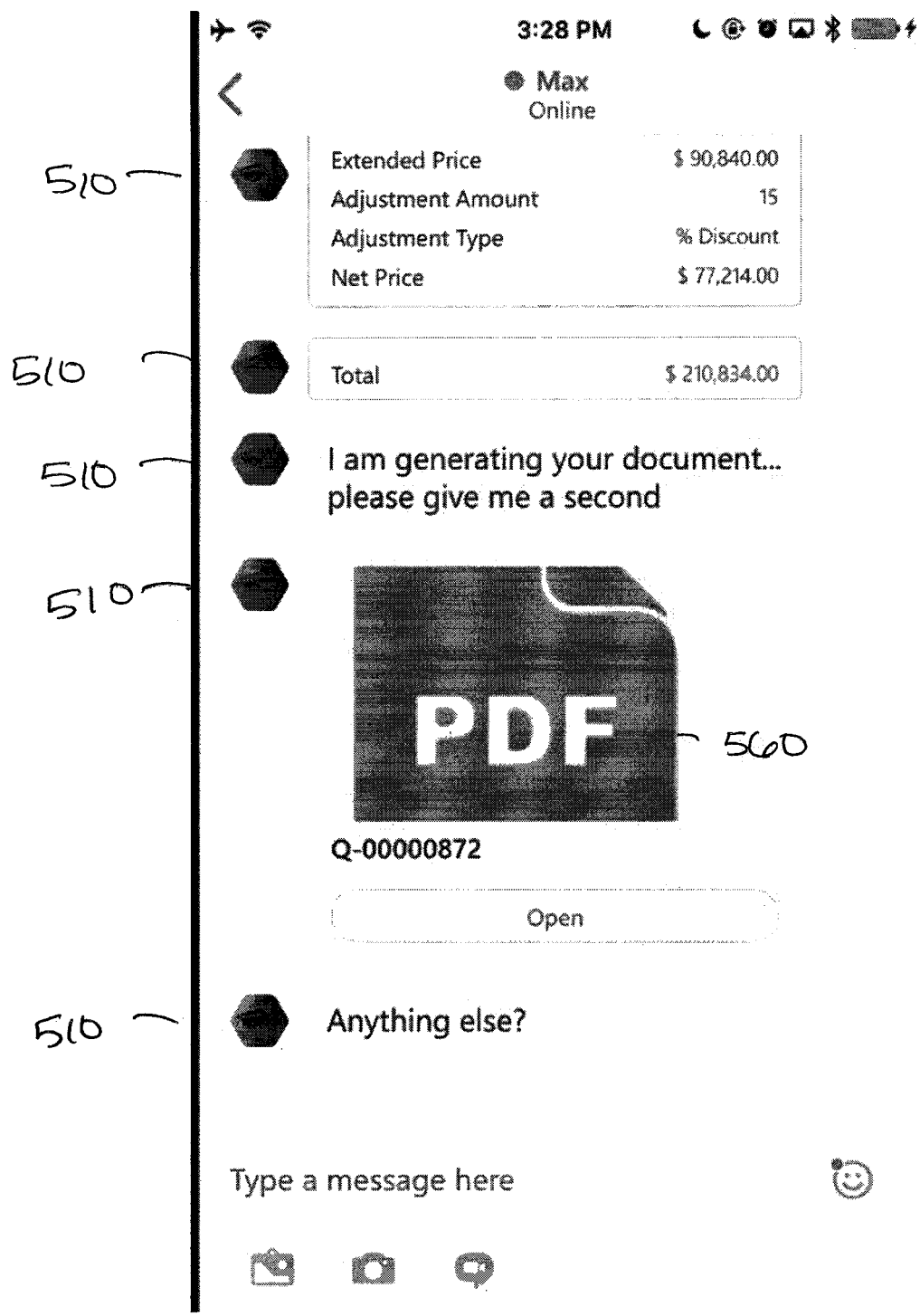

FIGS. 5K and 5L: The Agent provides an updated quote summary and quote 560.

Figure 2:
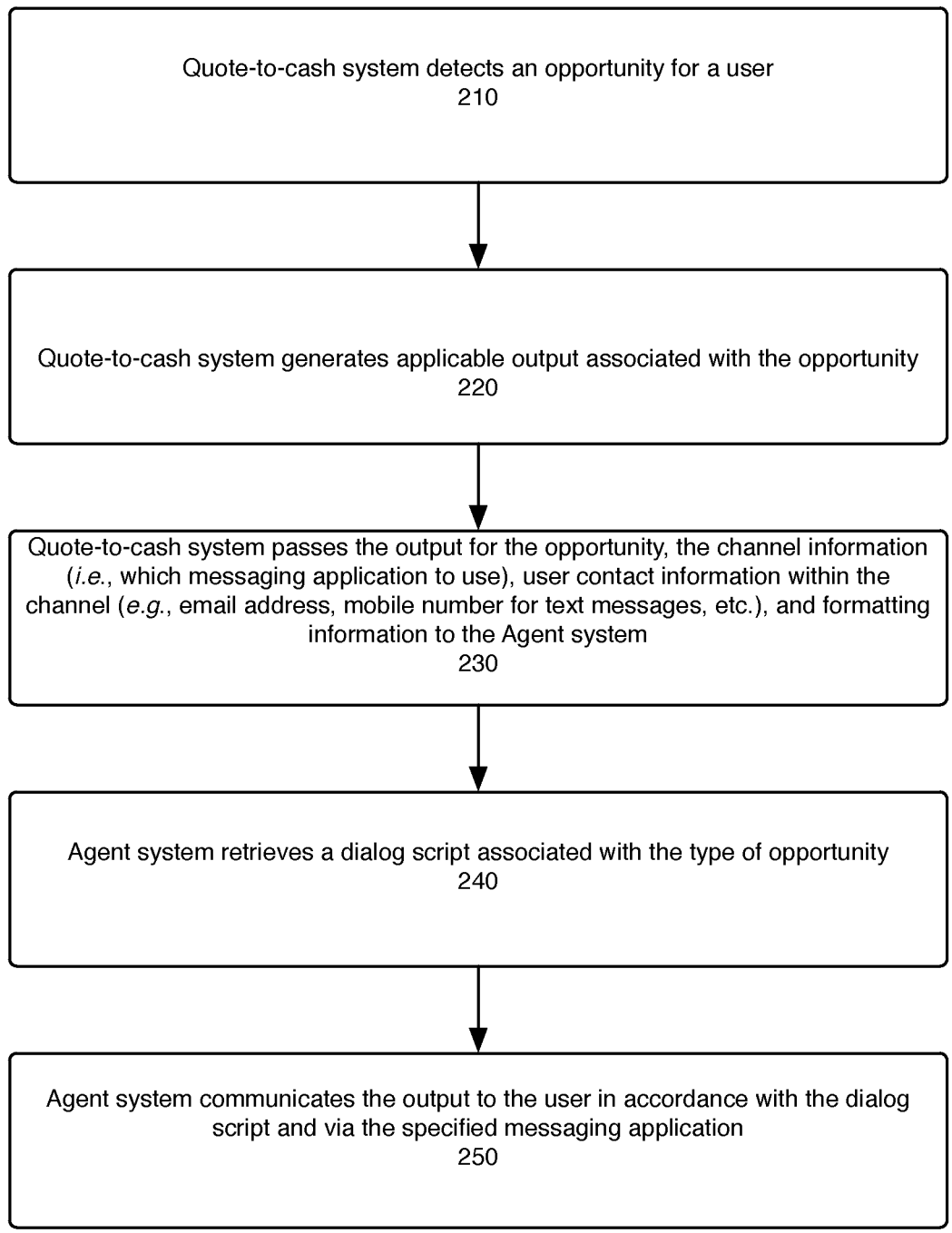
FIG. 2 is a flowchart that illustrate a method, according to one embodiment, for an Agent initiating communications with a user.

The Agent may initiate communications with a user when the quote-to-cash system identifies a quote-to-cash opportunity for an improved outcome in the quote-to-cash process. For example, the Agent may proactively reach out to users when the Agent identifies a renewal opportunity, pending approval, or updated contract status. FIG. 2 illustrates a method for the Agent initiating communications with a user.

The quote-to-cash system monitors for opportunities for users to have an improved quote-to-cash outcome. In one embodiment, the system applies machine learning algorithms to quote-to-cash data to identify such opportunities. As shown in FIG. 2, in response to the quote-to-cash system detecting an opportunity for a user (step 210), the quote-to-cash system generates applicable output associated with the opportunity (step 220). The quote-to-cash system then passes the Agent the following: the output for the opportunity, channel information (i.e., which messaging application to use), user contact information within the channel (e.g., a user email address, phone number, messaging app ID, etc.), and formatting information (step 230). The Agent retrieves a dialog script associated with the opportunity (each type of opportunity has its own dialog script) (step 240) and communicates the output to the user in accordance with the dialog script, which provides context for the communication (step 250). The Agent communicates with the user in the channel specified by the quote-to-cash system. In alternate embodiment, the Agent may identify the applicable channel associated with the user. Examples of the way either system (Agent or quote-to-cash system) identifies the applicable channel with which to initiate communications with the user include the following: (1) using the last channel used by the user to contact the Agent and (2) using a channel preference specified by the user (e.g., in a user profile within the quote-to-cash system) or a system administrator. In one embodiment, the user need not have communicated with the Agent before in the specified messaging channel.

The Agent may also be used for person-to-person-to-Agent communications, such as when the Agent is participating in a group chat with a plurality of users. In such case, the Agent may directly receive a quote-to-cash action request or detect one from analyzing the conversation thread in the chat.

The Agent may also be used for Bot-to-Agent-to-Person communications. In such case, a bot or agent associated with another system may initiate communication with a user via the Agent. For example, the Agent may pass communications to a bot such as APPLE's SIRI, which would then convey the communication to the user. Likewise, in certain embodiments, the use may call the Agent via another bot.

Figure 3:
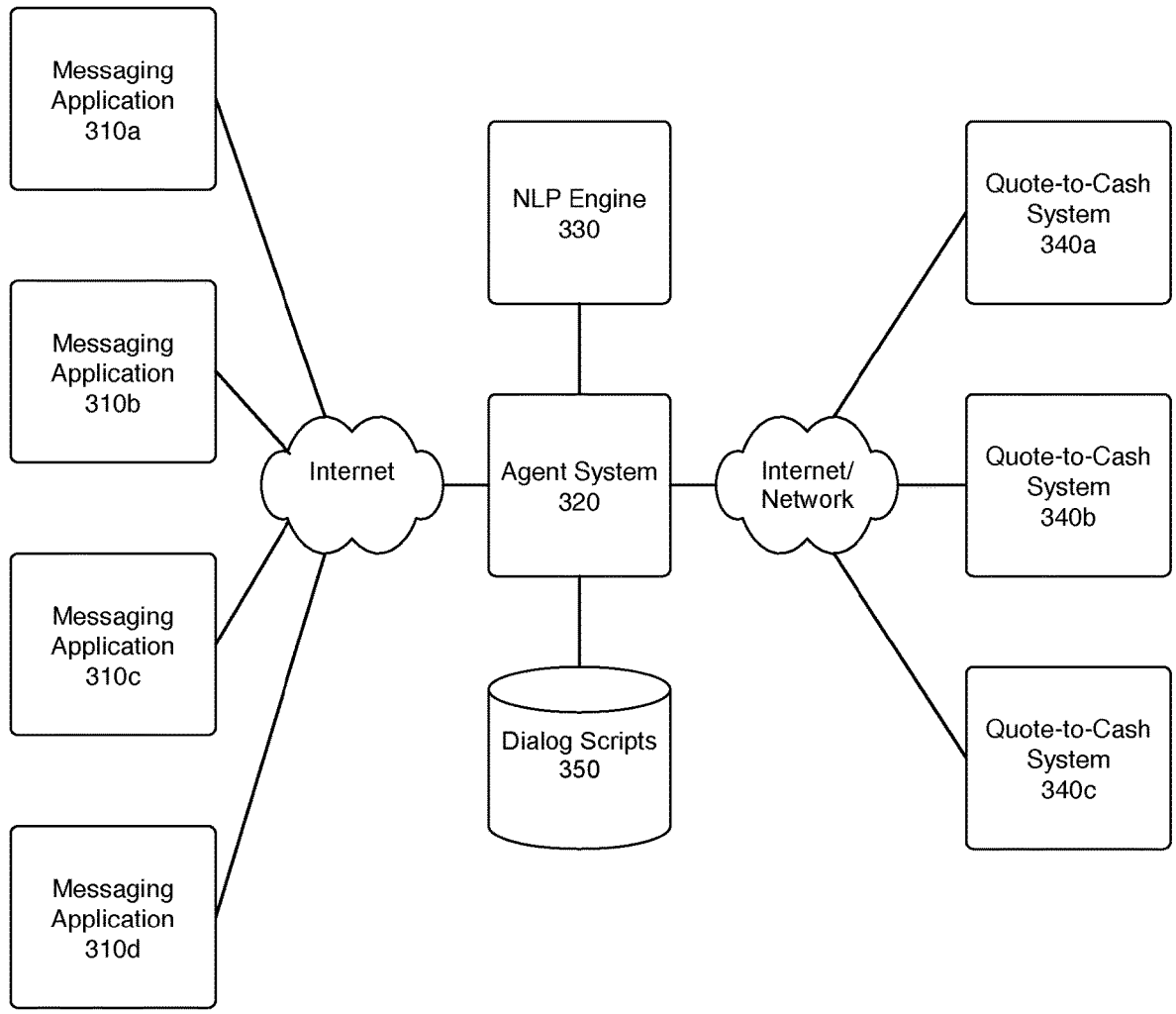
FIG. 3 is a block diagram that illustrates an example software architecture according to one embodiment.

FIG. 3 illustrates an example system architecture for performing the methods described herein. The methods described herein may be implemented in a system configured differently and are not limited to the system architecture illustrated in FIG. 3.

System 300 includes a plurality of messaging applications 310*a-d*, the Agent system 320, a NLP engine 330, and one or more quote-to-cash systems 340*a-c*.

In one embodiment, the messaging applications 310a-d are applications primarily designed for person-to-person enterprise communications. Examples include SKYPE for business, MICROSOFT TEAMS, FACEBOOK WORKPLACE, CORTANA, and SLACK.

The Agent system 320 is a cloud-based computer system that is able to interface with multiple inputs and outputs. The Agent system 320 handles the dialog triggers, parameter gatherings, message brokering, and response formatting from a given input to a given output. In one embodiment, the Agent is built using the MICROSOFT BOTBUILDER FRAMEWORK.

The Agent system 320 has access to a plurality of dialog scripts 350 that enable the Agent to communicate with the user using natural language. The Agent system 320 calls the NLP engine 330 to identify the meaning of user communications. An example of an NLP engine is LUIS.ai Natural Language Processing as part of MICROSOFT COGNITIVE SERVICES.

An example of a quote-to-cash system 340 is the APTTUS quote-to-cash suite of products running on the SALESFORCE platform. The Agent system 320 can communicate with multiple quote-to-cash endpoints (running on different platforms) and determine which quote-to-cash application to call based on user profile information.

Figure 4:
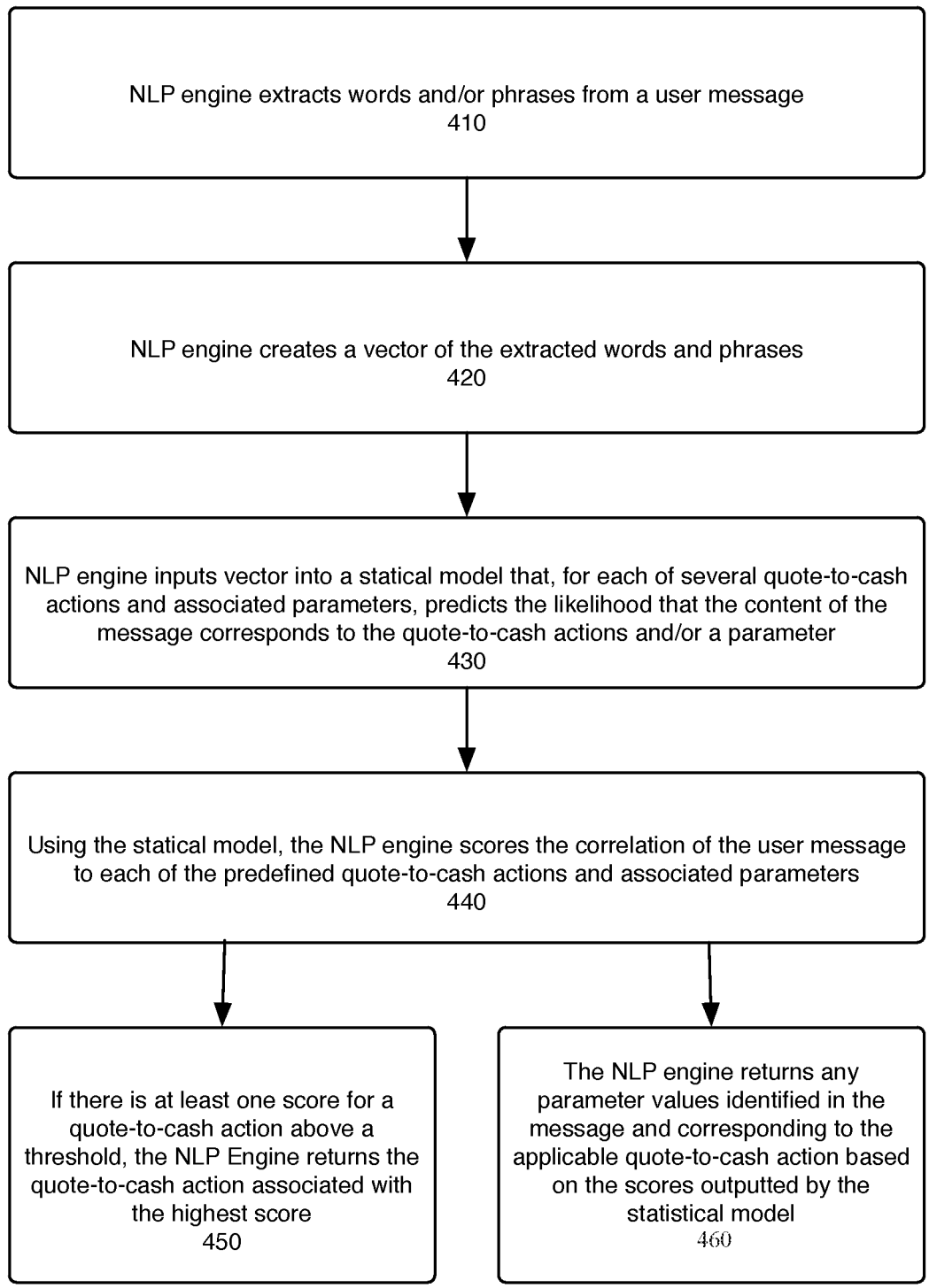
FIG. 4 is a flowchart that illustrates a method, according to one embodiment, for determining the natural language meaning of a user's message.

FIG. 4 illustrates a method, performed by the NLP engine, for determining the natural language meaning of a user's message. For each message passed to the NLP engine from the Agent, the NLP engine extracts words and/or phrases from the messages (step 410) and creates a vector of the extracted words and phrases (step 420). The vector is inputted into a statistical model, that for each of several quote-to-cash actions and associated parameters, predicts the likelihood that the content of the message corresponds to the quote-to-cash actions and/or a parameter (step 430). The statistical model is trained using a database in which words and phrases are mapped to quote-to-cash actions and parameters.

Using the statistical model, the NLP engine scores the correlation of the user message to each of the predefined quote-to-cash actions and associated parameters (i.e., each score reflects the likelihood of the message including the applicable quote-to-cash action or parameter) (step 440). If there is at least one quote-to-cash action with a score above a minimum confidence threshold, the NLP engine returns to the Agent the highest-scoring quote-to-cash action above the threshold (step 450). The NLP engine all returns any associated parameters identified in the message (i.e., corresponding to the returned quote-to-cash action and with a score above a threshold) (step 460).

The methods described herein are embodied in software and performed by one or more computer systems (each comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for enabling a user to initiate a quote-to-cash system action and receive a quote-to-cash system output via one of a plurality of messaging applications that are external to a quote-to-cash system, the method comprising:
    receiving a natural language message from the user via one of the plurality of messaging applications that are external to the quote-to-cash system;
    identifying a quote-to-cash action request in the natural language message, wherein identifying the quote-to-cash action request comprises:
        extracting words and phrases from the natural language message,
        creating a vector of the extracted words and phrases in the natural language message from the user,
        inputting the vector into a statistical model that, for each of a plurality of quote-to-cash actions, predicts the likelihood the extracted words and phrases correspond to the quote-to-cash action and associated parameters, wherein the statistical model is trained using a database in which words and phrases are mapped to quote-to-cash actions and parameters,
        for each quote-to-cash action in the statistical model, calculating a score indicating the likelihood the natural language message includes the quote-to-cash action, and
        in response to at least one quote-to-cash action having a score above a minimum confidence threshold, selecting the quote-to-cash action associated with the highest score above the threshold and returning any associated parameters identified in the natural language message;
    retrieving a dialog script associated with the quote-to-cash action request;
    identifying one or more parameters that need to be obtained from the user to perform the requested quote-to-cash action;
    using the dialog script, conversing with the user in natural language via the external messaging application until all of the identified one or more parameters are obtained, wherein, for at least one parameter that needs to be obtained, displaying a catalog of options from within the external messaging application as part of the dialog script and enabling the user to swipe to see contents of the catalog and select an option for the at least one parameter, wherein, after the user selects an option from the catalog, the dialog script proceeds based on the selected option;
    calling the quote-to-cash system with the quote-to-cash action request and the one or more parameters obtained from the user including the at least one parameter that was obtained by the user swiping to see the contents of the catalog and selecting the option for the at least one parameter, wherein calling the quote-to-cash system comprises selecting a quote-to-cash system from one of a plurality of quote-to-cash systems based on user profile information;
    obtaining a quote-to-cash output from the quote-to-cash system; and
    communicating the quote-to-cash output to the user via the external messaging application.

2. The method of claim 1, wherein the quote-to-cash system output is one of the following: a quote, a contract, an upsell recommendation, application of a discount, an approval request, an updated price, confirmation of an updated product cart, and any information or updates to the foregoing.

3. The method of claim 1, wherein the method further comprises:

for each parameter associated with the highest-scoring quote-to-cash action, calculating a score indicating the likelihood of the natural language message including the parameter; and for any parameters with a score above a threshold, determining that the natural language message includes the parameter.

4. The method of claim 1, wherein there is a different dialog script for each of a plurality of quote-to-cash action requests.

5. A non-transitory computer-readable medium comprising a computer program, that, when executed by a computer system, enables the computer system to perform the steps for enabling a user to initiate a quote-to-cash action and receive a quote-to-cash output via one of a plurality of messaging applications that are external to a quote-to-cash system, the steps comprising:

receiving a natural language message from the user via one of the plurality of messaging applications that are external to the quote-to-cash system;

identifying a quote-to-cash action request in the natural language message, wherein identifying the quote-to-cash action request comprises:

extracting words and phrases from the natural language message, creating a vector of the extracted words and phrases in the natural language message from the user, inputting the vector into a statistical model that, for each of a plurality of quote-to-cash actions, predicts the likelihood the extracted words and phrases correspond to the quote-to-cash action and associated parameters, wherein the statistical model is trained using a database in which words and phrases are mapped to quote-to-cash actions and parameters, for each quote-to-cash action in the statistical model, calculating a score indicating the likelihood the natural language message includes the quote-to-cash action, and in response to at least one quote-to-cash action having a score above a minimum confidence threshold, selecting the quote-to-cash action associated with the highest score above the threshold and returning any associated parameters identified in the natural language message;

retrieving a dialog script associated with the quote-to-cash action request;

identifying one or more parameters that need to be obtained from the user to perform the requested quote-to-cash action;

using the dialog script, conversing with the user in natural language via the external messaging application until all of the identified one or more parameters are obtained, wherein, for at least one parameter that needs to be obtained, displaying a catalog of options from within the external messaging application as part of the dialog script and enabling the user to swipe to see contents of the catalog and select an option for the at least one parameter, wherein, after the user selects an option from the catalog, the dialog script proceeds based on the selected option;

calling the quote-to-cash system with the quote-to-cash action request and the one or more parameters obtained from the user including the at least one parameter that was obtained by the user swiping to see the contents of the catalog and selecting the option for the at least one parameter, wherein calling the quote-to-cash system comprises selecting a quote-to-cash system from one of a plurality of quote-to-cash systems based on user profile information;

obtaining a quote-to-cash output from the quote-to-cash system; and communicating the quote-to-cash output to the user via the external messaging application.

6. The non-transitory computer-readable medium of claim 5, wherein the quote-to-cash system output is one of the following: a quote, a contract, an upsell recommendation, application of a discount, an approval request, an updated price, confirmation of an updated product cart, and any information or updates to the foregoing.

7. The non-transitory computer-readable medium of claim 5, wherein the steps further comprise:

for each parameter associated with the highest-scoring quote-to-cash action, calculating a score indicating the likelihood of the natural language message including the parameter; and for any parameters with a score above a threshold, determining that the natural language message includes the parameter.

8. The non-transitory computer-readable medium of claim 5, wherein there is a different dialog script for each of a plurality of quote-to-cash action requests.

9. A computer system for enabling a user to initiate a quote-to-cash system action and receive a quote-to-cash system output via one of a plurality of messaging applications that are external to a quote-to-cash system, the system comprising:

one or more processors;

one or more memory units coupled to the one or more processors, wherein the one or more memory units store instructions that, when executed by the one or more processors, cause the system to perform the operations of:

receiving a natural language message from the user via one of the plurality of messaging applications that are external to the quote-to-cash system;

identifying a quote-to-cash action request in the natural language message, wherein identifying the quote-to-cash action request comprises:

extracting words and phrases from the natural language message, creating a vector of the extracted words and phrases in the natural language message from the user, inputting the vector into a statistical model that, for each of a plurality of quote-to-cash actions, predicts the likelihood the extracted words and phrases correspond to the quote-to-cash action and associated parameters, wherein the statistical model is trained using a database in which words and phrases are mapped to quote-to-cash actions and parameters, for each quote-to-cash action in the statistical model, calculating a score indicating the likelihood the natural language message includes the quote-to-cash action, and in response to at least one quote-to-cash action having a score above a minimum confidence threshold, selecting the quote-to-cash action associated with the highest score above the threshold and returning any associated parameters identified in the natural language message;

retrieving a dialog script associated with the quote-to-cash action request;

identifying one or more parameters that need to be obtained from the user to perform the requested quote-to-cash action;

using the dialog script, conversing with the user in natural language via the external messaging application until all of the identified one or more parameters are obtained, wherein, for at least one parameter that needs to be obtained, displaying a catalog of options from within the external messaging application as part of the dialog script and enabling the user to swipe to see contents of the catalog and select an option for the at least one parameter, wherein, after the user selects an option from the catalog, the dialog script proceeds based on the selected option;

calling the quote-to-cash system with the quote-to-cash action request and the one or more parameters obtained from the user including the at least one parameter that was obtained by the user swiping to see the contents of the catalog and selecting the option for the at least one parameter, wherein calling the quote-to-cash system comprises selecting a quote-to-cash system from one of a plurality of quote-to-cash systems based on user profile information;

obtaining a quote-to-cash output from the quote-to-cash system; and communicating the quote-to-cash output to the user via the external messaging application.

10. The system of claim 9, wherein the quote-to-cash system output is one of the following: a quote, a contract, an upsell recommendation, application of a discount, an approval request, an updated price, confirmation of an updated product cart, and any information or updates to the foregoing.

11. The system of claim 9, wherein the method further comprises:

for each parameter associated with the highest-scoring quote-to-cash action, calculating a score indicating the likelihood of the natural language message including the parameter; and for any parameters with a score above a threshold, determining that the natural language message includes the parameter.

12. The system of claim 9, wherein there is a different dialog script for each of a plurality of quote-to-cash action requests.

13. The method of claim 1, further comprising:

in response to the quote-to-cash system (i) monitoring for opportunities for users to have an improved quote-to-cash outcome, (ii) detecting an opportunity for a user, and (iii) generating applicable output associated with the opportunity, wherein the detected opportunity is for a new quote-to-cash action request that is different from the quote-to-cash action request in the natural language message received from the user, performing the following:

receiving output associated with the opportunity and channel information from the quote-to-cash system, retrieving a dialog script associated with the opportunity, and communicating the output associated with the opportunity to the user in accordance with the dialog script and the channel information.

14. The non-transitory computer-readable medium of claim 5, further comprising:

in response to the quote-to-cash system (i) monitoring for opportunities for users to have an improved quote-to-cash outcome, (ii) detecting an opportunity for a user, and (iii) generating applicable output associated with the opportunity, wherein the detected opportunity is for a new quote-to-cash action request that is different from the quote-to-cash action request in the natural language message received from the user, performing the following:

receiving output associated with the opportunity and channel information from the quote-to-cash system, retrieving a dialog script associated with the opportunity, and communicating the output associated with the opportunity to the user in accordance with the dialog script and the channel information.

15. The system of claim 9, further comprising:

in response to the quote-to-cash system (i) monitoring for opportunities for users to have an improved quote-to-cash outcome, (ii) detecting an opportunity for a user, and (iii) generating applicable output associated with the opportunity, wherein the detected opportunity is for a new quote-to-cash action request that is different from the quote-to-cash action request in the natural language message received from the user, performing the following:

receiving output associated with the opportunity and channel information from the quote-to-cash system, retrieving a dialog script associated with the opportunity, and communicating the output associated with the opportunity to the user in accordance with the dialog script and the channel information.

* * * * *